March 25, 1924.
F. H. QUINLAN
TRUCK
Filed May 5, 1922
1,488,061
2 Sheets-Sheet 1
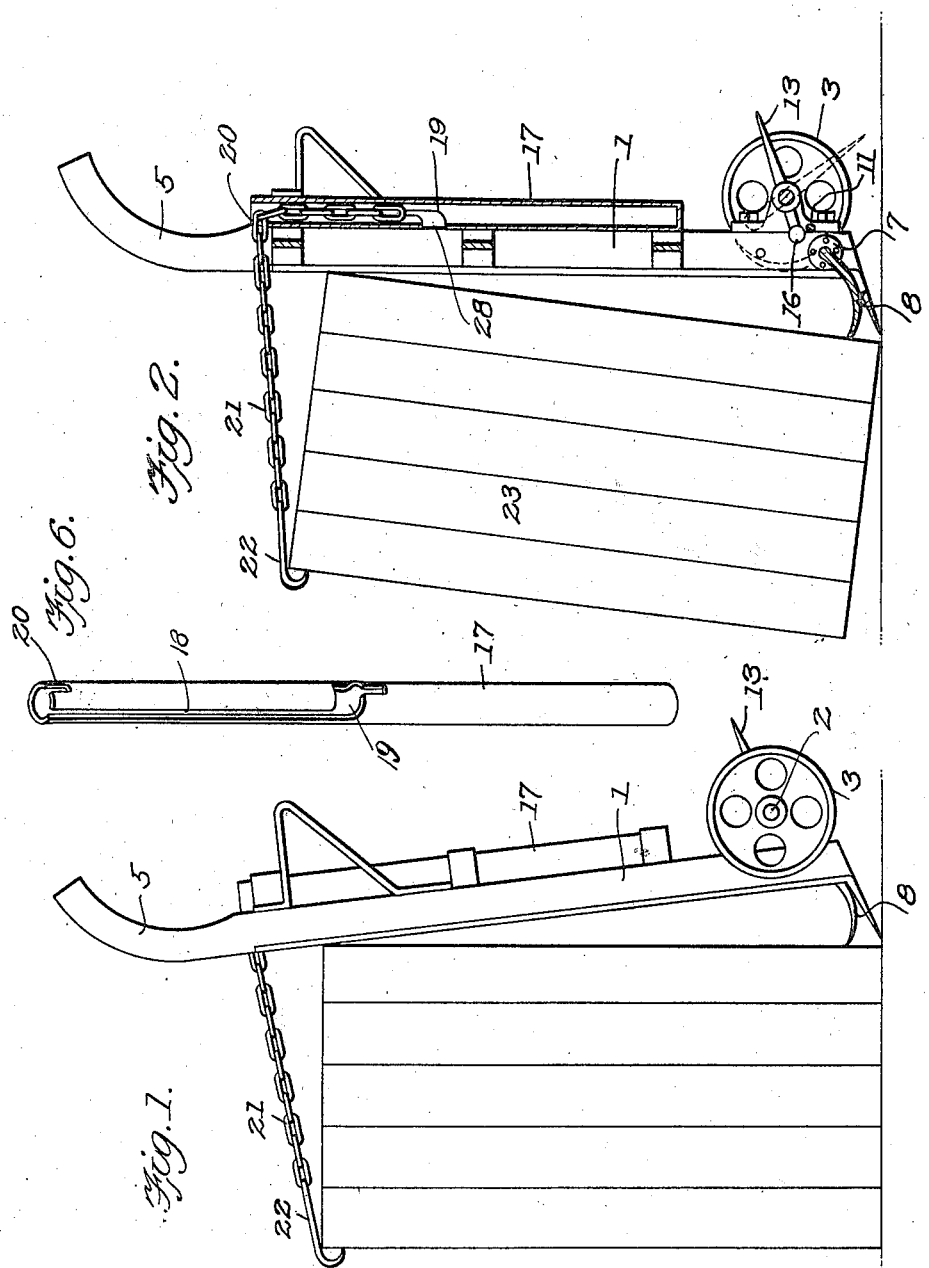
F. H. Quinlan
INVENTOR
BY Victor J. Evans
ATTORNEY
WITNESS:
R. E. Wise.

March 25, 1924.
F. H. QUINLAN
TRUCK
Filed May 5, 1922
1,488,061
2 Sheets-Sheet 2
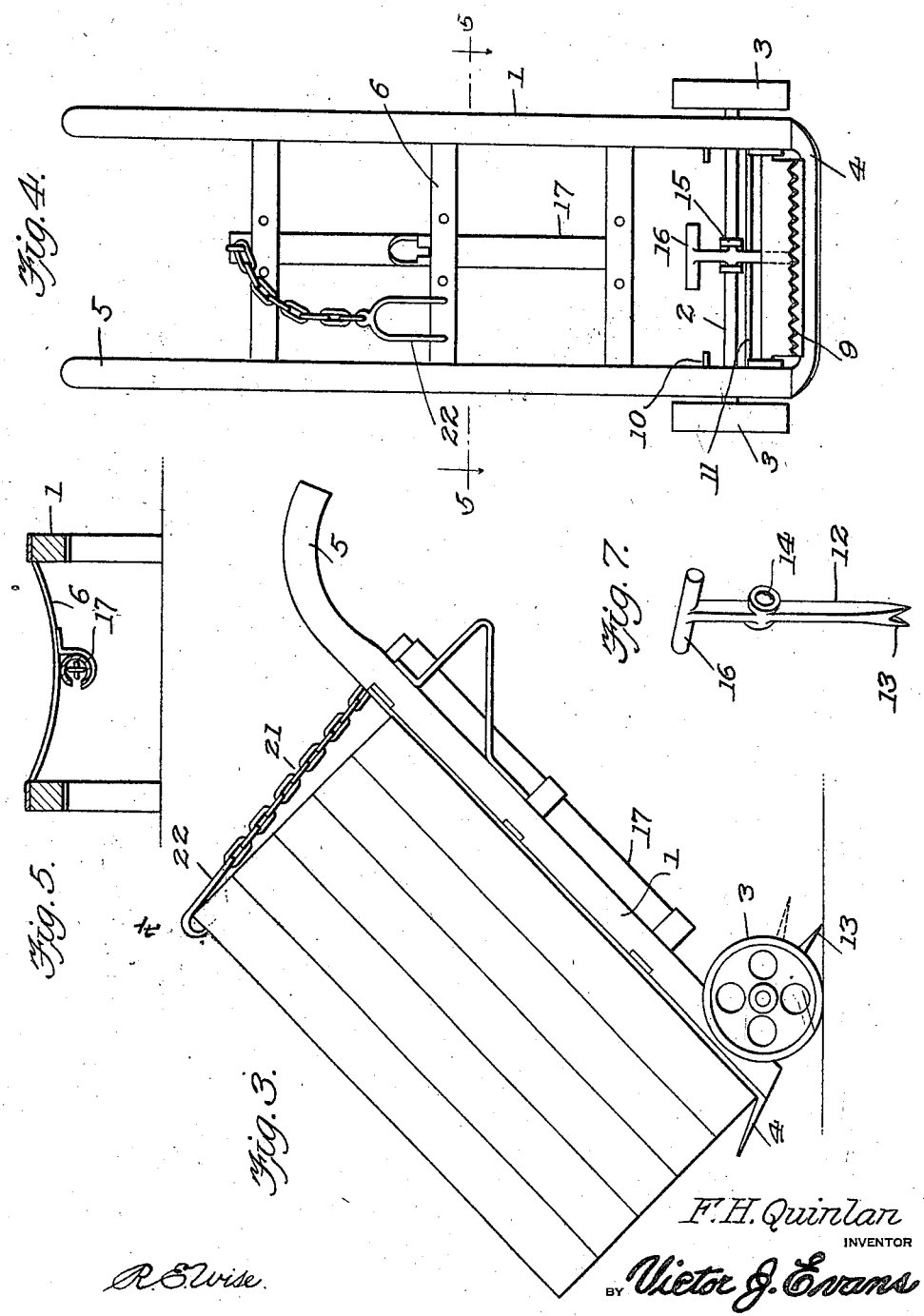
F. H. Quinlan
INVENTOR
BY Victor J. Evans
ATTORNEY
WITNESS:
R. E. Wise.

Patented Mar. 25, 1924.

1,488,061

UNITED STATES PATENT OFFICE.

FRANCIS HARRY QUINLAN, OF BARRE, VERMONT.

TRUCK.

Application filed May 5, 1922. Serial No. 558,600.

*To all whom it may concern:*

Be it known that I, FRANCIS HARRY QUINLAN, a citizen of the United States, residing at Barre, in the county of Washington and State of Vermont, have invented new and useful Improvements in Trucks, of which the following is a specification.

My present invention has reference to improvements in wheeled trucks such as are employed in handling crated merchandise.

In carrying out my invention, it is my purpose to provide a wheeled truck with means for gripping a box or crate to be arranged thereon and for causing the said box or crate to slide on to the bed of the truck when the latter is swung to normal position, means being provided for holding the truck against retrograde movement during the arrangement of the crate thereon.

It is also my purpose to produce a means for facilitating the arrangement of crates on wheeled trucks in which the truck has adjustably arranged thereon a flexible element such as a grab hook designed to engage with a crate when the truck is slid against the crate, said truck having pivoted inward of its bill an arched apron toothed to engage the crate and having loosely journaled on the shaft for its wheels a weight influenced spur, the arrangement being such that the swinging of the truck to normal load sustaining position will cause the apron to move the crate longitudinally on to the body of the truck, while the spur member will be brought to ground engaging position to prevent an accidental rearward movement of the truck when the crate is automatically arranged thereon.

The foregoing, and other objects which will present themselves as the nature of the invention is better understood, may be accomplished by a construction, combination and operative association of parts such as is disclosed by the drawings which accompany and which form part of this application.

In the drawings:—

Figure 1 is a side elevation showing a truck provided with the improvement, and arranged in a position to receive a crate.

Figure 2 is a similar view with parts of the truck broken away and parts in section.

Figure 3 is a side elevation showing the arrangement of parts when the crate is received on the truck, and illustrating the spur brought to floor contacting position to prevent the accidental rearward movement of the truck.

Figure 4 is a top plan view of a truck in accordance with this invention.

Figure 5 is a sectional view on the line 5—5 of Figure 4.

Figure 6 is a detail view of the slotted tubular member for adjustably receiving the grab hook chain.

Figure 7 is a perspective view of the spur.

The truck 1 is of the ordinary construction, having its side members, adjacent its forward end provided on their under faces with bearings for a shaft 2 on the ends of which are journaled the ground wheels 3. The forward end of the truck is provided with the usual upwardly inclined bill 4, and the side members have their rear ends shaped to form the same with the handles 5. The side members are connected at suitable intervals, the connecting elements 6 providing the open body of the truck.

To the rear of the bill 4 I journal in suitable bearings 7 on the confronting faces of the side members of the truck trunnions formed on the inner corners of a cross sectionally rounded apron 8. The apron has its outer edge pointed and toothed, as at 9. The apron, when a load is received on the truck is designed to be swung between the side members of the said truck and to be limited in such swinging by engagement with inwardly directed studs 10 on the said side members.

Forward of the shaft or axle 2 there is secured between the side members of the truck a rod 11. The numeral 12 designates a member which has one of its ends sharpened and forked to provide spurs 13. The member is formed with a bearing opening 14 through which passes the shaft or axle 2, suitable means 15 holding the member 12 against lateral movement on the shaft. The member 12, beyond its bearing, and at its end opposite that provided with the spurs 13 is headed, as at 16. The head weights one end of the spur member 12 so that the same will be swung normally to the position illustrated in Figures 2 and 4 of the drawings, the rod 11 limiting the swinging of the spur member to inactive position.

Centrally secured between the cross members 6 of the truck body there is a tubular member 17 provided with an elongated slot 18 that has an inner angle passage 19. The upper end of the member 17 is also formed with a notch 20. Designed to be received in the member 17 is a chain 21. The chain may be adjusted by arranging certain of the links thereof in the angle passages of the slot 18 and also arranging certain of the links in the notch 20. The chain carries at its outer end a grab hook 22 which is designed to be brought over the outer corner of a box or crate 23 when the latter is to be positioned upon the truck. When this is to be accomplished the truck is arranged at an inclination with respect to the crate 23, as disclosed in Figure 1 of the drawings. The grab hook is brought to engage the upper and outer corner of the crate, and the chain 21 is properly adjusted with respect to its tubular housing 17. The tilting of the truck will likewise cause the apron to swing against the bill of the truck so that the pointed outer edge of the apron is in contact with the inner face of the crate 23. A swinging of the truck to normal position will, by the weight of the crate 23 on the pointed end of the apron, cause the latter to swing inwardly of the truck and likewise cause the sliding of the crate on to the body of the truck. The operator may swing the member 12 to bring the teeth 13 thereof into ground contacting position which will prevent the rearward movement of the truck when the wheels are again brought to ground contacting position. A forward wheeling of the truck will automatically release the element 12 from floor engagement and the weighted end 16 thereof will swing the same to initial inoperative position.

Having described the invention, I claim:—

A wheeled truck of the character described comprising a tubular member longitudinally disposed intermediate the side members of said truck and being provided with an elongated slot having an angle passage arranged adjacent its inner terminal, said terminal being offset from the body portion, said tubular member being formed with a notch in its upper end adjacent the elongated slot, a grab hook, of a flexible element secured to said grab hook and adapted to be received in the slot, passage and notch of the tubular member as and for the purpose specified.

In testimony whereof I affix my signature.

FRANCIS HARRY QUINLAN.